United States Patent [19]

Bott

[11] 4,170,322

[45] * Oct. 9, 1979

[54] VEHICLE ARTICLE CARRIER

[76] Inventor: John A. Bott, 931 Lake Shore Dr., Grosse Pointe Shores, Mich. 48236

[ * ] Notice: The portion of the term of this patent subsequent to Oct. 25, 1994, has been disclaimed.

[21] Appl. No.: 779,521

[22] Filed: Mar. 21, 1977

Related U.S. Application Data

[60] Division of Ser. No. 604,643, Aug. 14, 1975, Pat. No. 4,055,284, which is a continuation-in-part of Ser. No. 486,415, Jul. 8, 1974, abandoned.

[51] Int. Cl.² ............................................. B60R 9/00
[52] U.S. Cl. .................................................. 244/326
[58] Field of Search .......... 224/29 R, 42.1 R, 42.1 D, 224/42.1 E, 42.1 F, 42.1 G; 248/225.3, 346, 350; 280/179 R, 179 A; 105/475, 478, 480, 499; 52/718

[56] References Cited

U.S. PATENT DOCUMENTS

| Re. 26,539 | 3/1969  | Bott ............... 224/42.1 R |
|------------|---------|-------------------------------|
| 3,212,457  | 10/1965 | Looker ........... 280/179 R X |
| 3,517,473  | 6/1970  | Kistner et al. .......... 52/718 |
| 3,519,179  | 7/1970  | Stephen ......... 224/42.1 E    |
| 3,623,642  | 11/1971 | Stephen ......... 224/42.1 E    |
| 3,681,887  | 8/1972  | Luew .................. 52/718  |
| 3,840,250  | 10/1974 | Bott ................ 280/179 R |
| 3,856,194  | 12/1974 | Helm ............... 248/350 X  |
| 4,055,284  | 10/1977 | Bott ............... 224/42.1 D |

*Primary Examiner*—Trygve M. Blix
*Assistant Examiner*—Winston H. Douglas
*Attorney, Agent, or Firm*—Harness, Dickey & Pierce

[57] ABSTRACT

An article carrier is mounted on an automobile body. The carrier consists of separate spaced parallel slats fastened flatly against an exterior surface of the automobile body. The slats are closed at their opposite ends by eyed end caps. The end caps enclose the hollow interiors of the slats, help to hold the slats in place and provide locations to which ropes, straps or other article securing devices may be attached.

16 Claims, 11 Drawing Figures

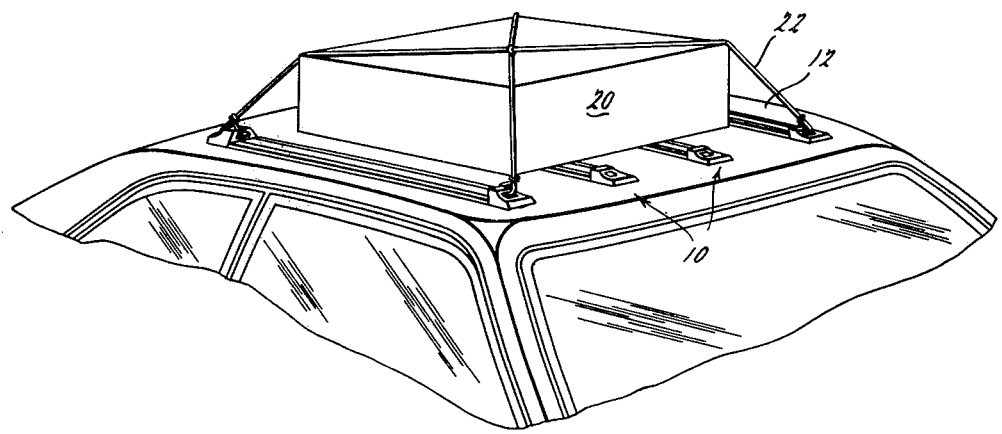
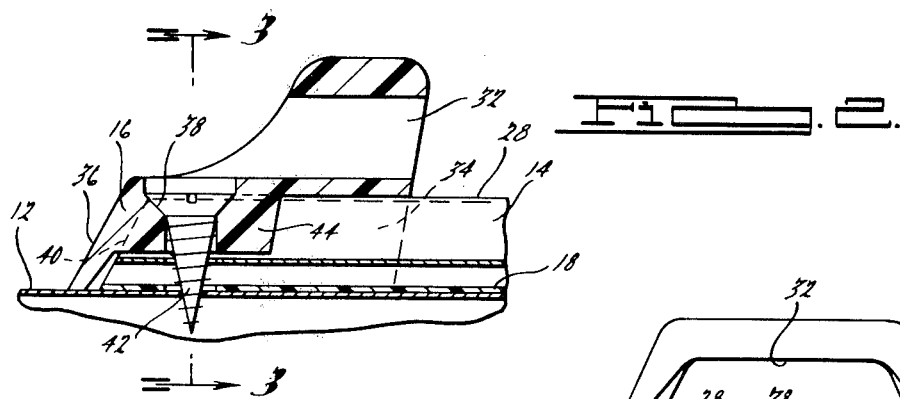
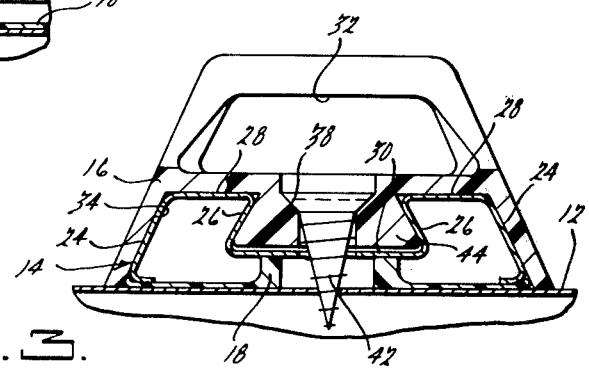
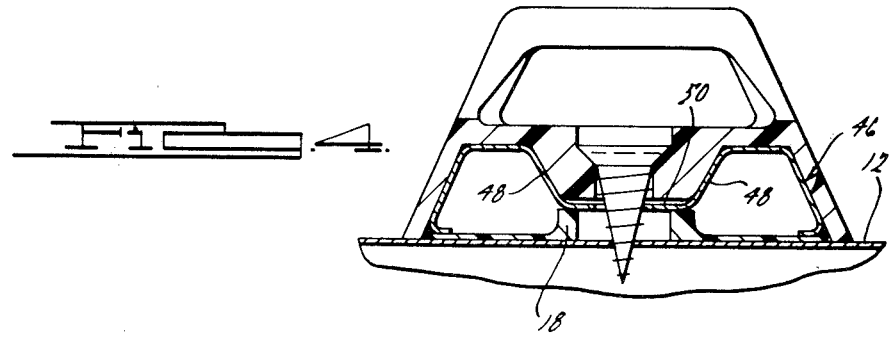

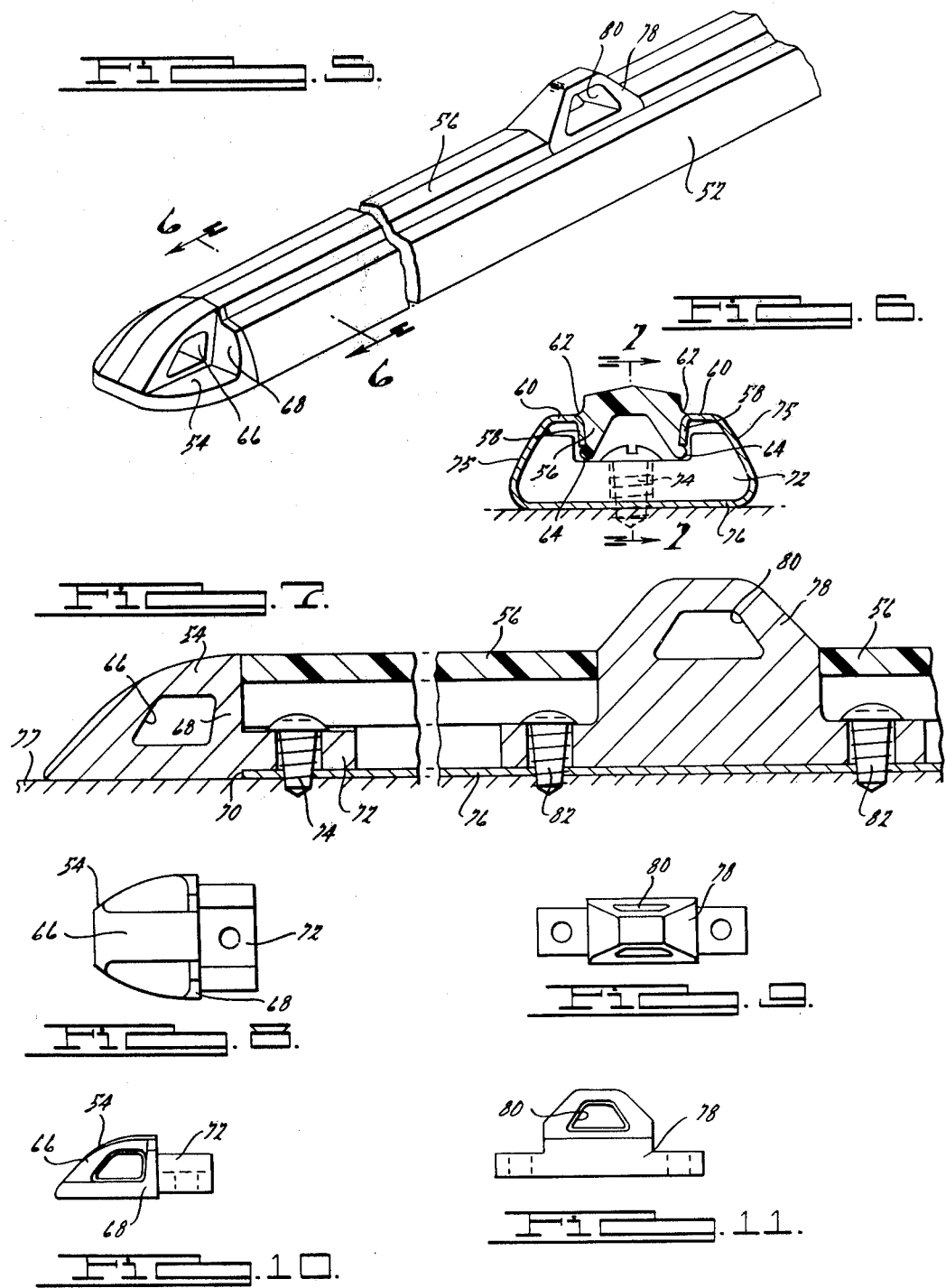

VEHICLE ARTICLE CARRIER

This is a division of application Ser. No. 604,643, filed Aug. 14, 1975 now U.S. Pat. No. 4,055,284 which was a Continuation-in-part of application Ser. No. 486,415 filed July 8, 1974, now abandoned.

BACKGROUND OF THE INVENTION

One of the embodiments of the invention illustrated herein was originally disclosed in my prior U.S. Application Ser. No. 486,415, filed June 8, 1974. The present application illustrates additional embodiments of the invention in which eyed end caps are interfitted with the opposite ends of article supporting slats.

SUMMARY OF THE INVENTION

The article carrier of the present invention is attractive in appearance, is relatively inexpensive to manufacture and presents a minimal wind resistant profile. The carrier is distinguished by the simplicity of its design and its relatively unobtrusive appearance. While the carrier of the present invention may utilize slats of varying shape, including slats having special upper grooves providing means of attachment for various article securing devices, the rack may also utilize conventional slats which do not have such special grooves. The opposite ends of the slats are, however, interfitted with special end caps. The end caps are fastened directly to the automobile body surface on which the device is mounted and thus the end caps help to hold the slats in place on the automobile body. The end caps also close the opposite ends of the slats (which are hollow) and provide an eyelet or opening to which a rope, hook or other article securing device may be affixed.

DESCRIPTION OF THE FIGURES OF THE DRAWING

FIG. 1 is a perspective view of a fragmentarily illustrated automobile having an article carrier of the present invention mounted on the roof thereof and with an article to be transported secured in place on the carrier;

FIG. 2 is an enlarged longitudinal sectional view of a portion of the structure illustrated in FIG. 1;

FIG. 3 is a sectional view of the structure illustrated in FIG. 2 taken along the line 3—3 thereof;

FIG. 4 is a view of structure similarly illustrated in FIG. 3 depicting a modified form of the present invention;

FIG. 5 is a broken perspective view of a slat assembly of a modified form of luggage rack according to the present invention;

FIG. 6 is an enlarged sectional view of the structure illustrated in FIG. 5 taken along the line 6—6 thereof;

FIG. 7 is a sectional view of the structure illustrated in FIG. 6 taken along the line 7—7 thereof;

FIGS. 8 and 9 are reduced scale plan views of two of the parts of the slat assembly illustrated in FIGS. 5 to 7; and FIGS. 10 and 11 are elevational views of the parts illustrated in FIGS. 8 and 9, respectively.

DETAILED DESCRIPTION OF THE ILLUSTRATED EMBODIMENTS OF THE INVENTION

FIG. 1 depicts a luggage carrier in the form of a plurality of spaced parallel slat assemblies 10 mounted on an automobile roof 12. The slat assemblies 10 are separate from one another and are only connected through the automobile roof 12. Each slat assembly 10 consists of a hollow roll formed steel slat 14 fitted with a pair of end caps 16 at its opposite ends. The slats 14 rest on rubber mounting pads 18. FIG. 1 depicts a package or box 20 resting on several of the slat assemblies 10 and being held in place by means of a rope 22 connected to the end caps 16 of other slat assemblies.

FIG. 3 depicts the cross sectional shape of the slat 14 which will be seen to have a pair of upwardly convergingly inclined outer walls 24 and a pair of spaced upwardly converging inner walls 26. The inner and outer walls 24 and 26 on each side of the slat are connected by supporting ledges 28. The supporting ledges 28 are coplanar and form the surfaces on which the box 20 or other article to be carried rests. The inner walls 26 define a dove-tail shaped groove which is open to the top of the slat 14.

The end caps 16 are of identical construction and are conveniently made from a resinous plastic material by means of the injection molding process. Each end cap 16 will be seen to have an eyelet 32 for the reception of the rope 22 or other article securing device. Each end cap is further formed with a socket 34 for telescopically receiving the end of the slat 14 and with an end wall 36 which closes the socket and covers the hollow interior of the slat from view. The end caps 16 are made with a screw hole 38 for the reception of screws 42 which are threaded into the automobile roof 12. Each screw 38 passes through an end cap key portion 44 which is conformably received within the slat groove 30. The method of assembling an end cap 16 onto a slat 14 is simply to slide the key portion 44 into the groove 30 from the end of the slat until an end edge 40 of the slat abuts the end of the socket 34 as defined by the end wall 36.

From the foregoing it will be apparent that a pair of end caps 16 are telescopically interfitted onto the opposite ends of each slat 14. Thus, a pair of end caps 16, a slat 14, a pair of screws 42 and a mounting pad 18 comprise a slat assembly 10. In the embodiment of FIGS. 1-3, the screws 38 are the sole means by which the slats 14 are held onto the roof 12. It will be apparent, however, that additional screws (not illustrated) may be provided which connect the slats 14 to the roof 12 in locations intermediate their ends. In any case, the end caps 16 and their screws 38 at least partially aid in retaining the slats 14 on the roof. The end caps also serve to close the slat 14 at their ends and provide a means of attachment for the rope 22 or other article securing device used to hold an article to be transported on the slat assemblies 10. Due to the interrelationship of the key 44 with the dove-tailed groove 30, as well as the close fit of the walls 24 and ledges 28 within the socket 34, relative lateral movement between the end caps 16 and slat 14 is prevented.

A slightly modified form of the invention is illustrated in FIG. 4 in which a slat 46 is provided with inner walls 48 which define an upwardly open groove 50. The walls 48 extend in an upwardly outwardly diverging path and do not serve to capture the portion of the end cap which is received therein.

A slat assembly of a more significantly modified form is illustrated in FIGS. 5 to 11. The slat assembly of this form of the invention utilizes a roll formed sheet metal slat 52 and injection molded plastic end caps 54 telescopically interfitted with the opposite ends of the slat 52. A protective and decorative plastic strip 56 is mounted on the upper side of the slat 52 and is supported between a pair of inner walls 58 of the slat. The slat 52 is formed with a pair of upper supporting ledges 60 joined to the upper ends of the inner walls 58 and engageable by ribs 62 formed along the opposite sides of the strips 56. The strip 56 is provided with outwardly projecting beads 64 at the bottom of its opposite sides which engage the lower edges of the walls 58. Thus, the walls 58 are trapped between the ribs 62 and beads 64 on the opposite sides of the strip 56 thereby locating the strip in the space between the walls 58.

It will be seen that the slat 52 is of essentially hollow construction. While the hollow interior of the slat 52 is closed on its upper side by the plastic strip 56, it is also closed at its opposite ends by the end caps 54. Each end cap 54 is formed with an eyelet 66 which provides a means for securing rope or other article securing devices to the luggage carrier. The end caps 54 are further provided with a wall 68 conforming to the outer cross sectional shape of the slat and strip combination. An end edge 70 of the slat 52 abuts one side of the wall 68 of each end cap 54. Each end cap 54 has an apertured tongue 72 which enters the hollow interior of the slat 52 and engages the inner sides of opposite side walls 75 of the slat. A screw 74 passes through the tongue 72 and a bottom wall 76 of the slat and is threaded into an automobile body surface 77 (FIG. 7) on which the entire luggage carrier is mounted. The bottom wall 76 of the slat 52 rests flatly against the body surface 77.

The slat assembly of FIGS. 5 to 11 is also provided with an intermediate tie-down device in the form of an injection molded member 78 positioned within the hollow interior of the slat 52. The member 78 projects upwardly between the walls 58 and is provided with an eyelet 80 for the reception of a rope or other article securing device. The member 78 rests on the bottom wall 76 of the slat 52 while screws 82 pass through the member 78 and wall 76 into the mounting surface 77 of the vehicle body. The protective strip 56 is suitably interrupted or cut away to accommodate the tie-down device 78.

It will be apparent that the slat assembly illustrated in FIGS. 5 to 11 utilizes a slat 52 of a relatively simple design. In common with the prior embodiments of the invention, this slat assembly utilizes an end cap which is telescopically interfitted with the slat. The screws 74 which hold the end caps 54 in place also help to secure the slat 52 on the roof. Of course, the slat assembly illustrated in FIGS. 5 to 11 is a intended to be used in combination with a plurality of such slat assemblies to define a complete article carrier.

What is claimed is:

1. In an article carrier for an automotive vehicle,
   an article supporting slat adapted to be mounted in contiguous relation to a surface portion of the vehicle,
   said slat being of greater width than height in transverse cross-section with said width extending generally parallel to said vehicle surface portion,
   said slat having a longitudinally extending upwardly facing article supporting surface, said surface having an upwardly presenting groove,
   a one-piece end cap member interfitted with one end of said slat and including a portion adapted to be received within said groove; and
   single fastening means adapted to secure said end cap to said slat and said end cap and said slat to said surface portion.

2. An article carrier as set forth in claim 1 wherein said fastening means extends through said portion of said end cap and said slat and engages said surface portion of said vehicle.

3. An article carrier as set forth in claim 1 wherein another portion of said end cap overlies said slat.

4. An article carrier as set forth in claim 3 wherein said another portion of said end cap is adapted to receive an article securing device.

5. An article carrier as set forth in claim 4 wherein said portion comprises an eyelet opening.

6. An article carrier as set forth in claim 1 wherein said end cap is disposed in longitudinal abutting relationship with said slat.

7. An article carrier as set forth in claim 6 wherein said another portion of said end cap is adapted to receive an article securing device.

8. An article carrier as set forth in claim 7 wherein said portion comprises an eyelet opening.

9. In an article carrier for an automotive vehicle,
   an article supporting slat adapted to be mounted in contiguous relation to a surface portion of the vehicle,
   said slat being of greater width than height in transverse cross-section with said width extending generally parallel to said vehicle surface portion,
   said slat having a longitudinally extending upwardly facing article supporting surface, said surface having a central upwardly presenting groove having converging side walls,
   a one-piece combination end cap and tie-down member interfitted with a terminal end of said slat and adapted to facilitate securing articles upon said surface,
   said one-piece combination member including
   (a) a first portion defining an eyelet opening for receiving an article securing means,
   (b) a second portion having sides closing the adjacent end of said groove, and
   (c) a third portion extending longitudinally from said second portion and adapted to be received at least in part within said groove at said terminal end of said slat, and
   fastening means securing said combination member to said slat.

10. The structure set forth in claim 9 wherein said fastening means comprises a fastener extending through said third portion of said member and said slat into the vehicle surface for securing said member and slat to said body surface.

11. The structure set forth in claim 9 wherein said second portion of said combination member is arranged generally transversely of said slat.

12. The structure as set forth in claim 9 wherein said eyelet openging is located longitudinally outwardly from the terminal end of said slat.

13. The structure as set forth in claim 9 wherein said groove is provided with a closure strip, and wherein an outer surface portion of said combination member conforms generally to the shape of said strip.

14. In an article carrier for an automotive vehicle,
   an article supporting slat adapted to be mounted in contiguous relation to a surface portion of the vehicle,
   said slat being of greater width than height in transverse cross-section with said width extending generally parallel to said vehicle surface portion, said slat having a pair of longitudinally extending side walls, said side walls forming an upwardly facing surface having a longitudinally extending groove formed therein, a protective strip disposed between said sidewalls and within said groove to define a hollow interior within said slat, an article securing means disposed in part within said hollow interior and located at least in part below said protective strip, and fastening means disposed within said hollow interior and extending downwardly through said article securing means and said slat into the vehicle surface for securing said article securing means within said hollow interior and said slat to said vehicle.

15. The invention as set forth in claim 14 wherein said article securing means comprises a tie-down eyelet.

16. The invention as set forth in claim 14 wherein said fastening means comprises a threaded fastener element.

* * * * *